(12) United States Patent
Shacham et al.

(10) Patent No.: US 9,340,055 B2
(45) Date of Patent: May 17, 2016

(54) SECURITY IMAGE PRINTING

(75) Inventors: Omri Shacham, Mitzpe Ramon (IL); Oren Haik, Beer-Sheva (IL)

(73) Assignee: Hewlett-Packard Development Company, L.P., Houston, TX (US)

(*) Notice: Subject to any disclaimer, the term of this patent is extended or adjusted under 35 U.S.C. 154(b) by 25 days.

(21) Appl. No.: 14/125,158

(22) PCT Filed: Jun. 15, 2011

(86) PCT No.: PCT/US2011/040464
§ 371 (c)(1),
(2), (4) Date: Dec. 10, 2013

(87) PCT Pub. No.: WO2012/173612
PCT Pub. Date: Dec. 20, 2012

(65) Prior Publication Data
US 2014/0132694 A1      May 15, 2014

(51) Int. Cl.
*B41J 2/01* (2006.01)
*B41M 3/14* (2006.01)
*H04N 1/00* (2006.01)
*B41F 11/02* (2006.01)
*G03G 21/04* (2006.01)
*B42D 25/29* (2014.01)

(52) U.S. Cl.
CPC .................. *B41M 3/14* (2013.01); *B41F 11/02* (2013.01); *B41M 3/146* (2013.01); *B42D 25/29* (2014.10); *G03G 21/043* (2013.01); *H04N 1/00883* (2013.01); *B42D 2035/26* (2013.01)

(58) Field of Classification Search
CPC ....... B41J 13/00; B42D 25/29; B42D 25/324; B42D 25/333; B42D 2035/14; B42D 2035/34; B41M 3/14; G09F 3/0292
USPC ........... 347/107, 105, 101, 171, 221; 283/91, 283/85, 86, 93, 94, 72
See application file for complete search history.

(56) References Cited

U.S. PATENT DOCUMENTS

| 6,101,293 A | 8/2000 | McKenzie |
| 7,327,904 B2 | 2/2008 | Zhou et al. |
| 7,869,090 B2 | 1/2011 | Wang et al. |
| 2005/0180569 A1 | 8/2005 | Kevenaar |

(Continued)

FOREIGN PATENT DOCUMENTS

| EP | 1302329 A2 | 4/2003 |
| WO | WO-2010043846 | 4/2010 |

OTHER PUBLICATIONS

European Patent Office. Extended European Search Report, Mail date Apr. 8, 2015, Application No. EP11 86 7735.

(Continued)

*Primary Examiner* — Henok Legesse
(74) *Attorney, Agent, or Firm* — HP Inc. Patent Department

(57) ABSTRACT

Printing with a single colorant a security feature imperceptible to the naked eye. For a digital security image having a first region formed by a first pattern of binary pixels and a second region formed by a different second pattern of binary pixels, the first and second patterns are printed with the single colorant. A darker one of the first and second printed patterns is determined. The security image is printed with the single colorant, the region corresponding to the darker printed pattern printed at a reduced gray level such that the printed first and second regions appear substantially indistinguishable to the naked eye.

13 Claims, 12 Drawing Sheets

(56) References Cited

U.S. PATENT DOCUMENTS

| | | |
|---|---|---|
| 2005/0219634 A1 | 10/2005 | Murakami et al. |
| 2008/0165387 A1 | 7/2008 | Wu |
| 2008/0240787 A1 | 10/2008 | Saito et al. |
| 2009/0207433 A1 | 8/2009 | Wang |
| 2009/0244641 A1 | 10/2009 | Wu |
| 2010/0040282 A1 | 2/2010 | Bala et al. |
| 2010/0123912 A1 | 5/2010 | Wang et al. |
| 2010/0259771 A1 | 10/2010 | Sakamoto |
| 2010/0259792 A1 | 10/2010 | Cole et al. |
| 2010/0321738 A1 | 12/2010 | Wu et al. |

OTHER PUBLICATIONS

International Searching Authority, The International Search Report and the Written Opinion, Dec. 9, 2011, 8 pages.

Ling Shao, Adaptive Resolution Upconversion for Compressed Video Using Pixel Classification (Research Paper), May 3, 2007; 7 Pages, http://www.hindawi.com/journals/asp/2007/071432.abs.html.

SECURITY IMAGE PRINTING

BACKGROUND

It is desirable to prevent unauthorized or counterfeit reproduction or forgery of many types of original documents. Such documents may include paper currency, negotiable instruments, event tickets, official records, medical prescriptions, diplomas, and many others.

As copier technology has improved, it has become easier to make realistic-looking copies of many of these original documents. In many cases, a copy can be difficult to distinguish from the original. In response, producers of these documents have added features to documents that make them harder to copy. These features often take the form of a security background printed on the original document by a high resolution printing process such as offset printing. Offset printing is typically an analog printing operation performed at a resolution that is equivalent to between 2,400 and 10,000 dots per inch (dpi). This security background on the original document is substantially indistinguishable to the naked eye at a normal viewing distance. However, a typical copier has scanning and printing capabilities that are of lower resolution than that of offset printing, often in the range of 300 to 1200 dpi. In addition, the optical scanner of a typical copier perceives and captures the security background differently from the human eye. As a result, the security background is readily detectable by the human eye on a reproduced document.

Nonetheless, in many applications it is desirable to print original documents on digital printing systems that are of lower resolution than offset printing, and of comparable resolution to copiers. Offset printing typically has high setup costs, and thus is cost-effective for printing large quantities of the identical document. However, many original documents are not printed in large quantities, and often original documents are printed in single quantity. For example, even if a set of diplomas for a particular university is printed in a single print run, the name of the graduate on each diploma will be different. Thus digital printing systems would be better suited to such applications than offset printing systems.

DETAILED DESCRIPTION

Figure 1A:
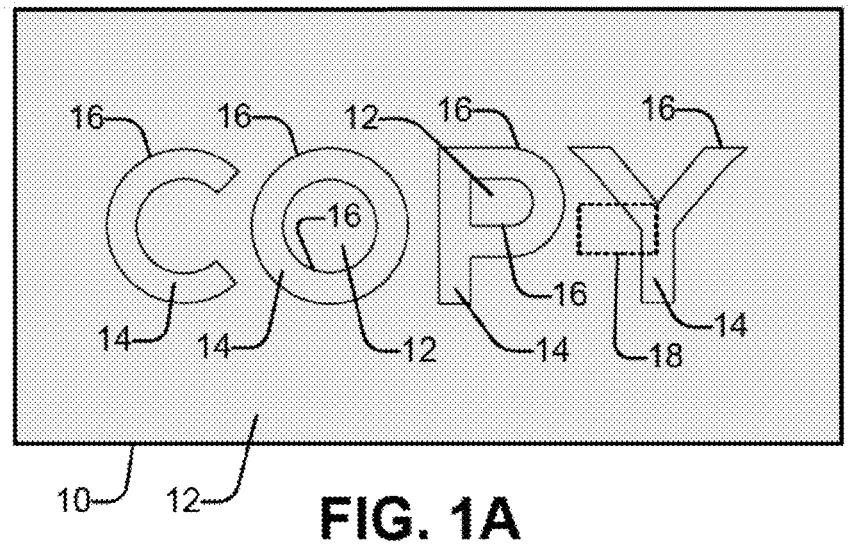
FIG. 1A is a schematic representation of an example security image of an original physical document, in accordance with an embodiment of the present disclosure.

Referring now to the drawings, there are illustrated embodiments of a technique and a printing system for printing, with a single colorant, a security feature that is substantially imperceptible to the naked human eye. A digital security image that includes the security feature has a first region formed by a first pattern of binary pixels and an abutting second region formed by a different second pattern of binary pixels. The first and second regions each have a similar gray level. The first and second patterns are printed on a print medium with the single colorant. The darker one of the first and second printed patterns is determined. The security image is printed on a print medium with the single colorant, where the region corresponding to the darker printed pattern printed at a reduced gray level such that the printed first and second regions appear substantially indistinguishable to the naked eye. It is advantageous to use a single colorant to adjust the appearance of printed regions since this can produce high quality results on printing systems that have less precise color registration than other printing systems which adjust the appearance using different or multiple colorants.

The print medium on which the security image is printed may be any type of suitable sheet or roll material, such as paper, card stock, cloth or other fabric, transparencies, mylar, and the like. The printing system may use any of a variety of digital printing technologies, including but not limited to liquid electrophotography, toner electrophotography (e.g. LaserJet), and liquid jetting (e.g. InkJet, including thermal and piezoelectric) printing technologies.

The printing system may be a digital press, a laser printer, or an inkjet printer, among many other devices. The printing system may include an optical scanner or a camera, or be included in a copier or an all-in-one device (e.g. a combination of at least two of a printer, scanner, copier, and fax), to name a few. As defined herein and in the appended claims, a "liquid" shall be broadly understood to mean a fluid not composed primarily of a gas or gases.

An original physical document typically includes a foreground image superimposed on a security image which forms the background of the original document. As can be appreciated with reference to FIG. 1A, a security image 10 of an original physical document has at least one first region 12 and at least one abutting second region 14. The border 16 shown in FIG. 1A does not appear in the printed security image 10 itself, but is illustrated in order to indicate the boundaries between regions 12 and 14. Regions 12 and 14 on the original physical document have a similar appearance to the naked human eye such that they are substantially indistinguishable by a viewer who views the document at a normal viewing distance without the aid of a loupe or other magnifying device. As a result, the security feature is imperceptible to the viewer.

Figure 1B:
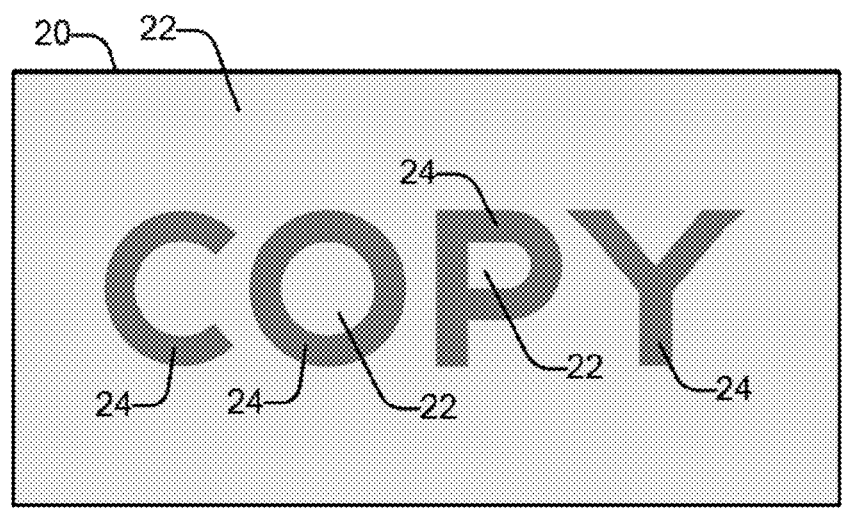
FIG. 1B is a schematic representation of a copy of the example security image of the original physical document of FIG. 1A made on a copier or a scanner/printer, in accordance with an embodiment of the present disclosure.

Considering now a copy 20 of the printed security image 10 made using a copier or scanner/printer, and with reference to FIG. 1B, the copy 20 reveals the security feature formed by the regions 22, 24. Regions 22 correspond to regions 12, and regions 24 to regions 14. On the copy 20, regions 22 do not have the same appearance as do regions 24. The security feature is determined by the shapes of the regions 22, 24. The example security feature illustrated in FIG. 1B is the word "COPY", which is visible on the copy 20 because region 24 is darker than region 22. Such a security feature which is not apparent on an original but which is visible on a copy is commonly known as a "VOID pantograph", since the word "VOID" is often used as the security feature. The security feature may be text, graphics, or any other feature that indicates that the copy 20 is not an original document. The difference in appearance between the regions 22, 24 may result from a difference in lightness or in optical density of the regions on the printed medium, a difference in appearance in the patterns that fill the regions as printed on the medium, or other differences. A difference in lightness or optical density between the regions 22, 24 of as little as 2% can reveal the security feature to the naked eye.

The example security image 10 and copy 20 typically represent a portion of the security image of an original document. For example, the security feature may be replicated a number of times in the security image; a number of different security features may be formed by differently shaped regions; the security features may be of different sizes; various security features may be placed in the security image at different orientations; and different patterns can be used in different regions. Including multiple security features on an original document in this manner typically makes the original document more secure against copying, because adjusting the copier settings in an attempt to prevent the visibility of one security feature may be ineffective against, or may even enhance, the visibility of a different security feature. The original document also includes a foreground image, readily perceived by the naked eye, that constitutes the subject matter of the document, such as the text and graphics of a diploma, event ticket, stocks, bonds, currency, etc.

Figure 2A:
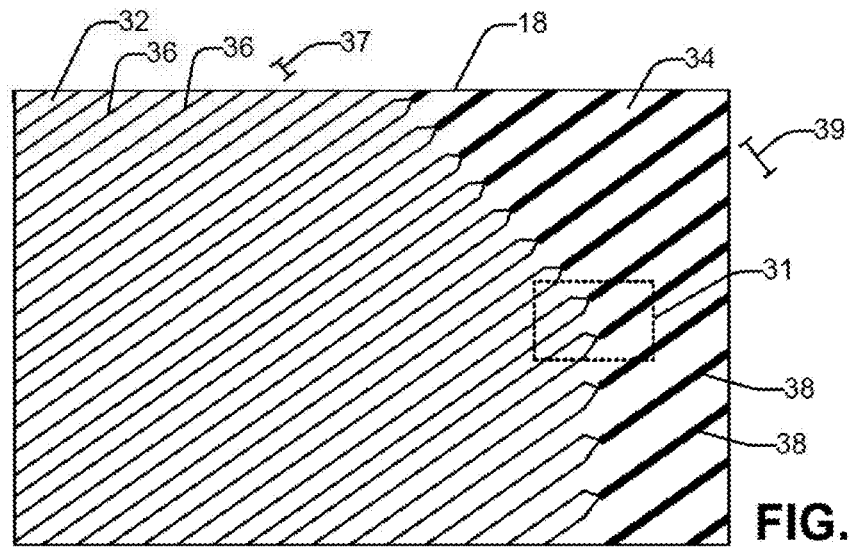
FIG. 2A is an enlarged view of an area of the example security image of FIG. 1A illustrating the patterns printed in different regions of the security image, in accordance with an embodiment of the present disclosure.

Considering now in greater detail the regions 12, 14 of the security image 10, and with reference to FIG. 2A, region 12 of the original document has a different pattern from region 14. FIG. 2A illustrates an enlarged area 18 of the example security image 10 of FIG. 1A. Region 12 has a first example pattern 32, and region 14 has a different second example pattern 34. In one embodiment, the first example pattern 32 has thinner parallel lines 36 which are disposed at a narrower interline spacing 37, while the second example pattern 34 has thicker parallel lines 38 which are disposed at a wider interline spacing 39. The thickness and spacing of the lines is chosen such that the perceived lightness, or the optical density, of the two regions on the original physical document is substantially the same, when the original document is viewed by the human eye from a normal viewing distance.

In other embodiments, the regions 12, 14 may use other patterns. For example, the lines in one region may be disposed at a different orientation compared to the lines of the other region, rather than at the same orientation. As another example, the lines may be continuous, broken, or a series of dots. A variety of patterns are contemplated.

Figure 2B:
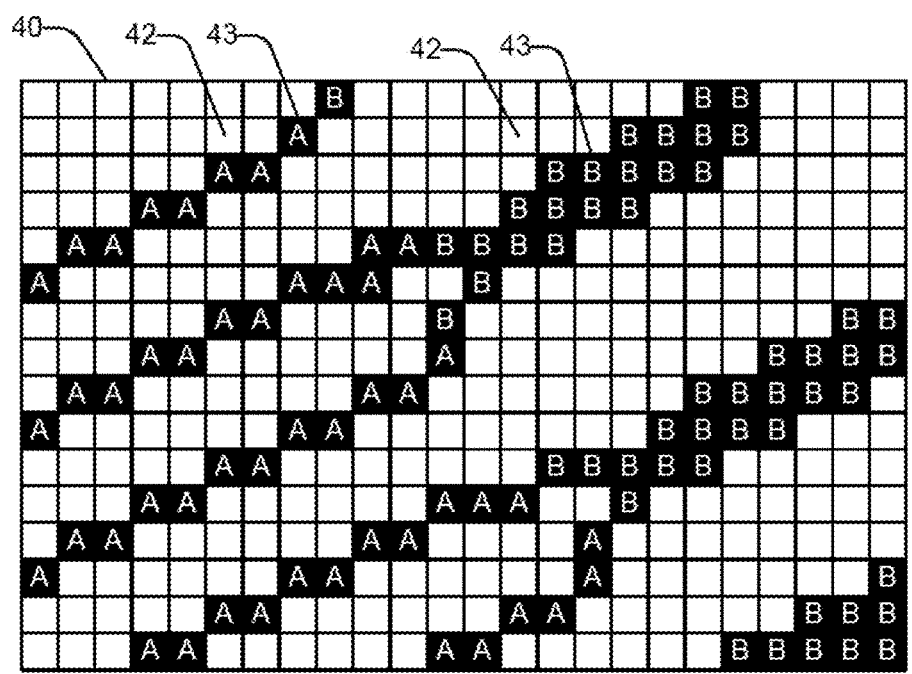
FIG. 2B is a schematic representation of an enlarged portion of a digital security image usable to print the original physical document of FIG. 1A including the example security image, in accordance with an embodiment of the present disclosure.

Considering now a digital security image usable by a printing system to print an original document having a security feature, and with reference to FIG. 2B, the digital security image includes a row-and-column matrix of binary-valued pixels. Each pixel has a value of ON or OFF. During printing, a single colorant is deposited by the printing system onto a print medium at those locations which correspond to the ON-valued pixels.

The portion 40 of the example digital security image illustrated in FIG. 2B corresponds to a portion 31 of the area 18 of the security image 10 that is illustrated in FIG. 2A. Filled squares, such as squares 43, represent ON-valued pixels. Empty squares, such as squares 42, represent OFF-valued pixels.

Within the row-and-column pixel matrix of the illustrated portion 40 of the digital security image are a first region that is formed by a first pattern of ON-valued binary pixels, and an abutting second region that is formed by a different second pattern of ON-valued binary pixels. The thickness of the lines formed by the ON-valued pixels, and the spacing between the lines resulting from the OFF-valued pixels, are not necessarily drawn to scale, but have been chosen for clarity of explanation. The first pattern is formed by the ON-valued binary pixels which are denoted by the letter "A", while the second pattern is formed by the ON-valued binary pixels which are denoted by the letter "B". The first and second regions, as printed, each have a perceived gray level. As defined herein and in the appended claims, the 'gray level' of a printed region of binary pixels of a digital image shall be broadly understood to mean the perceived relative darkness of the region. When printed, a region with a higher perceived gray level will appear darker (i.e. have a higher optical density), while a region with a lower perceived gray region will appear lighter (i.e. have a lower optical density), when viewed from a normal viewing distance. Printing both regions of the digital security image with a similar, or a substantially the same, gray level gives the regions, when printed on an original document, a similar lightness or optical density that makes the security feature indistinguishable to the naked eye in the ideal case.

The number and placement of the pixels chosen for each region of the digital security image may be intended to produce regions of the same or similar perceived gray level when printed. However, due to various printing effects and characteristics of the printing process, a viewer may be able to perceive differences between the first and second printed regions when an original document having the digital security image is printed. This, in turn, would undesirably render the security feature visible on the original printed document.

Figure 3A:
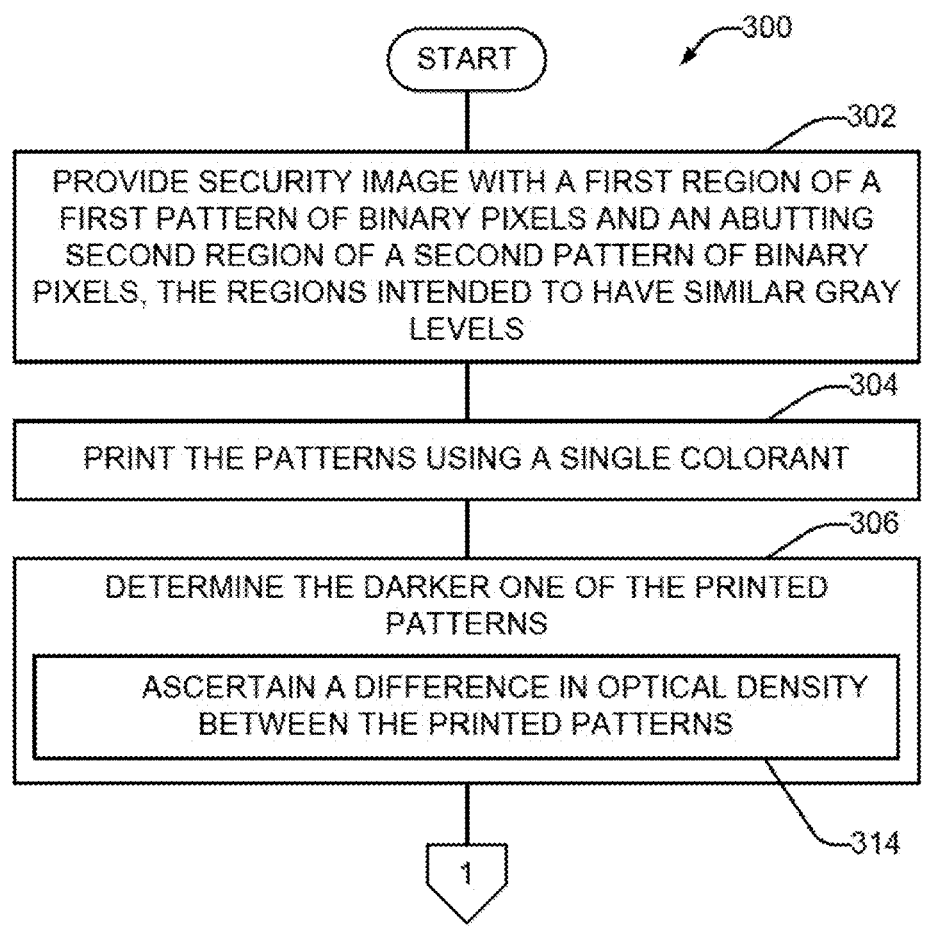
FIGS. 3A-B are flowcharts in accordance with an embodiment of the present disclosure of a method of digitally printing with a single colorant a security feature imperceptible to the naked eye.
Figure 3B:
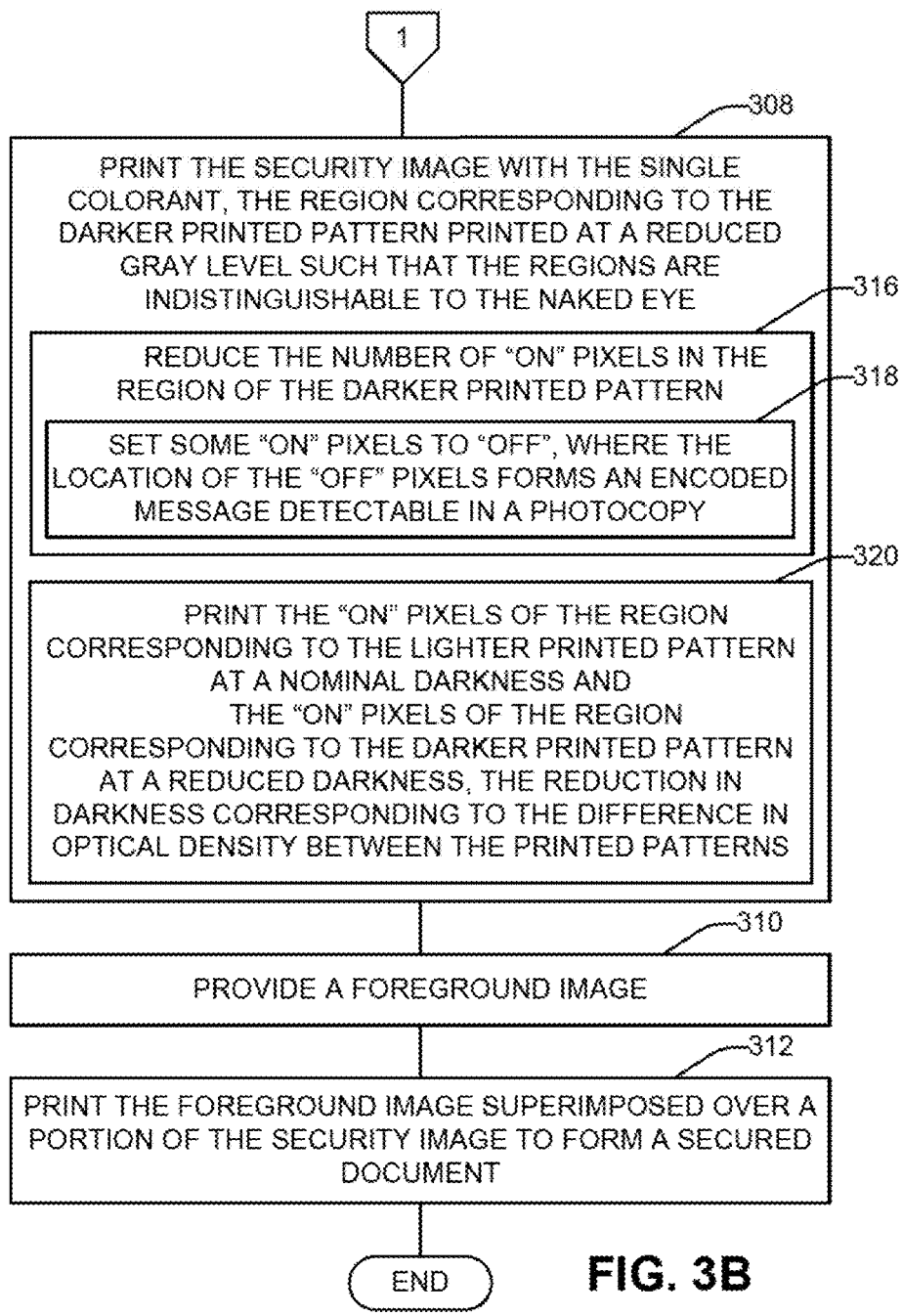

Considering now a method of digitally printing with a single colorant a security feature imperceptible to the naked eye, and with reference to FIGS. 3A-B, a method 300 begins at 302 by providing a digital security image having a first region formed by a first pattern of binary pixels and an abutting second region formed by a different second pattern of binary pixels, the pixels of the first and second regions each intended to have a similar gray level when printed. At 304, the first and second patterns are printed on a medium with the single colorant. The medium is typically the same type of medium on which the security image, typically with a foreground image superimposed thereon, is printed. Colorant is disposed on the print medium at locations which correspond to the ON-valued pixels of each pattern. The size, amount, or portion of each pattern printed is sufficient to allow an assessment or a measurement of the relative lightness of each pattern. For example, two rectangular areas of a given size may be printed, with each of the areas filled with a different one of the two patterns. At 306, the darker one of the first and second printed patterns is determined. At 308, the digital security image is printed on a medium with the single colorant, with the region corresponding to the darker printed pattern being printed at a reduced gray level such that the printed first and second regions appear substantially indistinguishable to the naked eye when viewed at a normal viewing distance.

In some embodiments, the determining includes, at 314, ascertaining a difference in optical density between the first and the second printed pattern. In such embodiments, the reduced gray level corresponds to the difference in the optical density between the two printed patterns.

Figure 4A:
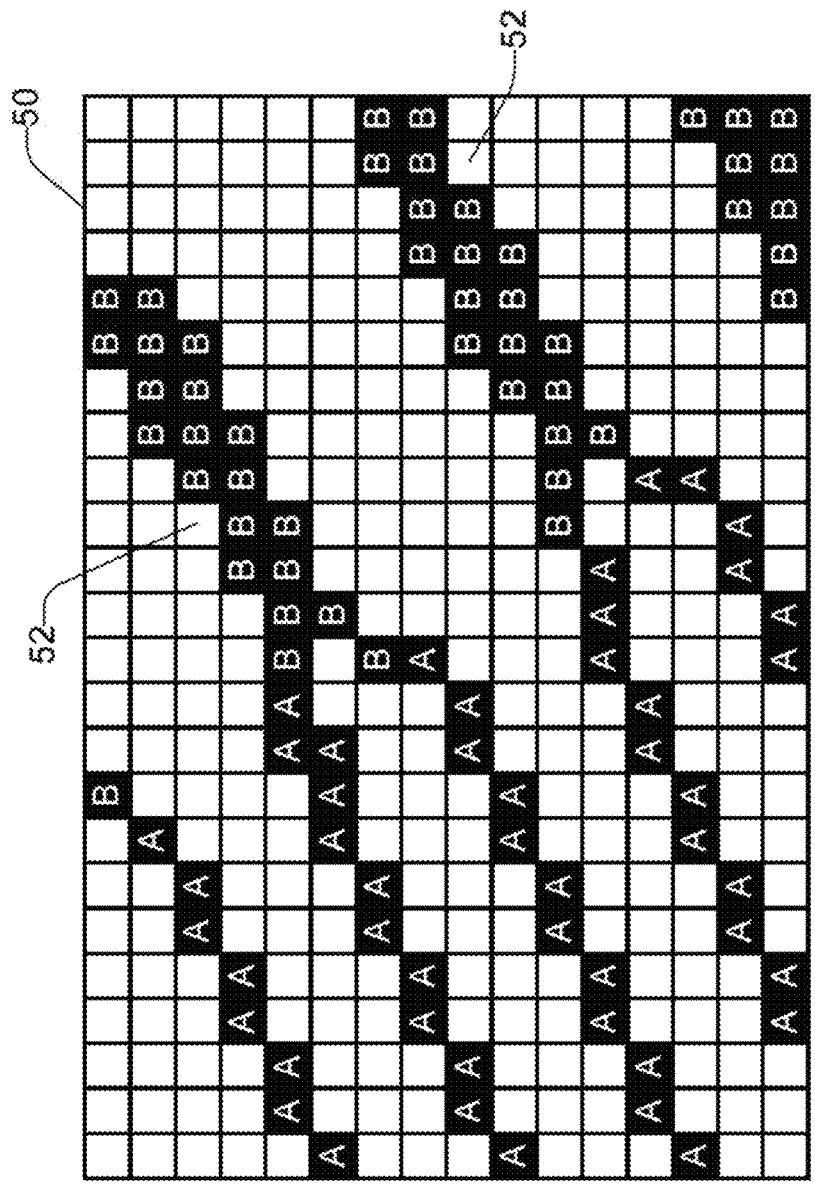
FIG. 4A is a schematic representation of a modified enlarged portion of the digital security image of FIG. 2B having a reduced number of ON-valued pixels for pattern B, in accordance with an embodiment of the present disclosure.

One technique to print the darker pattern at a reduced gray level in some embodiments includes, at 316, modifying the security image by reducing the number of binary pixels having an ON value in the region that corresponds to the darker printed pattern. One way in which the reduction may be accomplished is by applying a gray level screen to the security image. The reduction in the number of the binary pixels having the ON value typically corresponds to the difference in optical density between the first and the second patterns as printed. Reducing the number of binary pixels having an ON value typically includes setting selected ones of the ON-valued binary pixels to an OFF value. For example, consider a modified digital security image, a portion 50 of which is illustrated in FIG. 4A, and which corresponds to the portion 40 of FIG. 28. Assume, for example, that the second pattern of the digital security image, corresponding to pixels "B" in FIG. 2B, is determined to be about 4% darker when printed than the first pattern corresponding to pixels "A". The digital security image may be modified, as illustrated in FIG. 4A, by changing the value of a sufficient number of pixels from an ON value to an OFF value in order to reduce the gray level of the second pattern. For example, in FIG. 4A, pixels 52 have been changed to an OFF value; whereas in FIG. 2B, the pixels at these same locations have an ON value. The locations of the pixels whose value is changed from ON to OFF is typically chosen to avoid creating a regular pattern of holes in the image that would produce an artifact, such as a moiré pattern for example, that could be visible to the naked eye.

Figure 9:
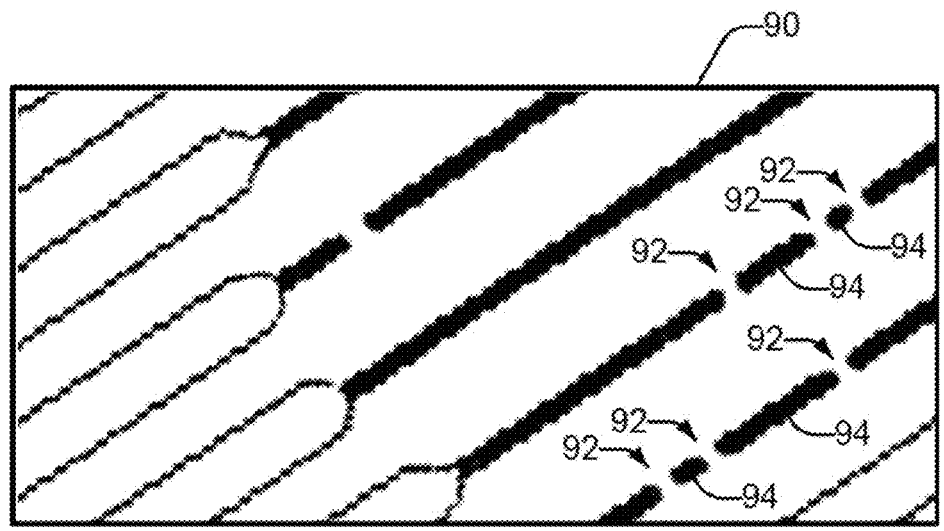
FIG. 9 is a schematic representation of the enlarged portion of the digital security image of FIG. 8 modified to both reduce the gray level of a darker region and encode a security message, in accordance with an embodiment of the present disclosure.

In some embodiments, and as will be discussed subsequently with reference to FIG. 9, the locations of the pixels in the pattern that are set, at 318, from an ON value to an OFF value can be selected to form an encoded message that is detectable in a copy of the printed security image that is made by a copier or a scanner/printer. The encoded message can provide an additional layer of security for an original printed document.

Another technique to print the darker pattern at a reduced gray level in some embodiments includes, at 320, printing each of the binary pixels having an ON value in the region corresponding to a lighter one of the first and second printed patterns at a nominal darkness level, and printing each of the binary pixels having an ON value in the region corresponding to the darker one of the first and second printed patterns at a reduced darkness level lower than the nominal darkness level. In this technique, the digital security image itself is not modified; in other words, the values of binary pixels of the image are not modified.

Figure 4B:
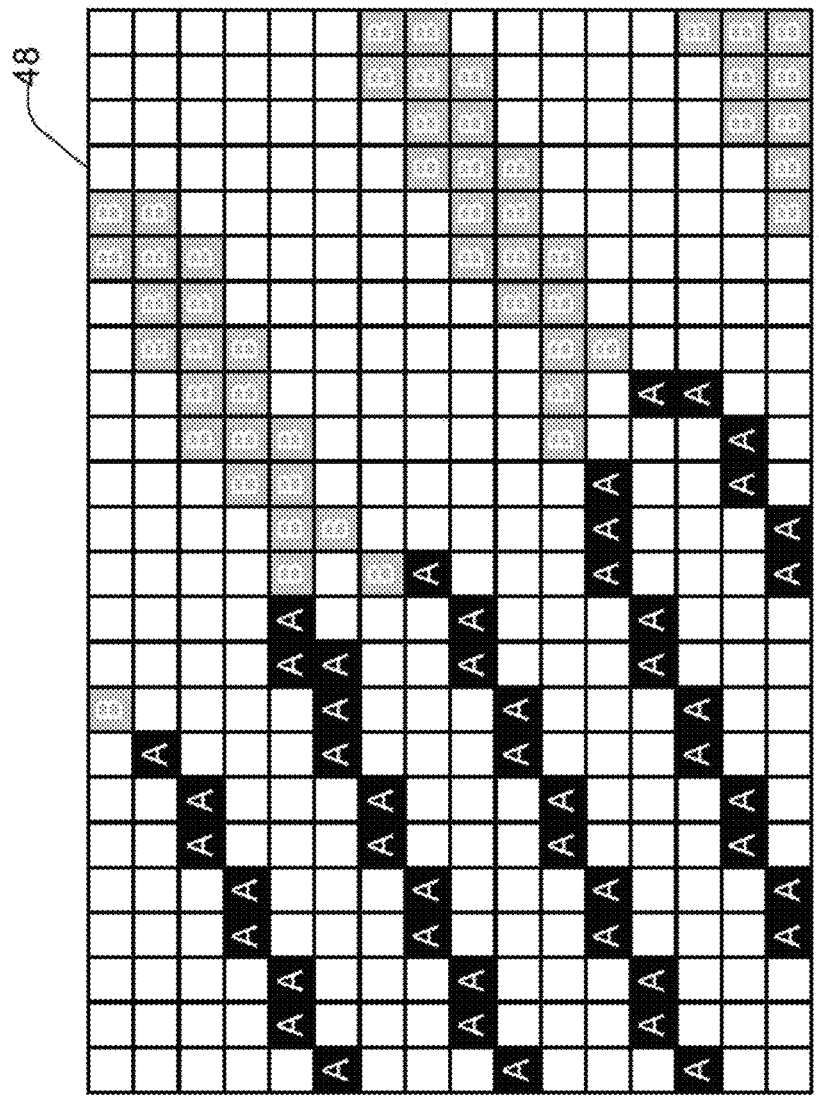
FIG. 4B is a schematic representation of an enlarged portion of the digital security image of FIG. 2B illustrated the ON-valued pixels of pattern B to be printed at a reduced gray level, in accordance with an embodiment of the present disclosure.

For example, consider the digital security image, a portion 48 of which is illustrated in FIG. 4B. Each pixel of the portion 48 has the same value as its corresponding pixel in portion 40 of FIG. 28B. Assume, for example, that the second pattern of the digital security image, corresponding to pixels "B" in FIG. 2B, is determined to be about 4% darker when printed than the first pattern corresponding to pixels "A". Accordingly, when printing the security image, the pixels "A" of FIG. 4B will each be printed at the nominal darkness level. The pixels "B" of FIG. 4B will each be printed at the reduced darkness level, as denoted by the lighter color shading used for the pixels "B". As a result, the gray level of the second printed pattern will be reduced. As will be discussed subsequently with reference to FIG. 10, different printing technologies may employ different techniques to implement the nominal and reduced darkness levels with the single colorant without modifying the digital security image.

Returning to the method 300, at 310 a foreground image is provided. The foreground image constitutes the text, graphics, and the like that constitute the subject matter of the original document to be printed, such as that of a diploma, an event ticket, stocks, bonds, currency, etc. At 312, the foreground image is superimposed over a portion of the security image and then the combined foreground image and security image are printed to form a secured original document that includes the security feature. The foreground image may be printed with a number and variety of different colorants, including the single colorant. While printing 312 the foreground image is illustrated in FIGS. 3A-B as separate from printing 308 the security image for clarity of explanation, it is to be understood that these printing operations are typically performed together, and that the security image is typically not be printed at the positions where the foreground image is printed.

In some embodiments, steps 304 and 306 may be repeated one or more times, if desired, after applying the gray level reduction techniques of step 316 or 320 to the printed patterns. This can verify that the two printed regions of the security image will be substantially indistinguishable to the naked eye prior to printing the security image. It can iteratively refine the amount of gray level reduction to be applied in order to reduce or eliminate any distinguishability between the two regions.

The method 300 uses knowledge of which of the ON valued pixels of the digital security correspond to the first pattern and which correspond to the second pattern in order to print the patterns at 304 and the security image at 308. In some embodiments, the digital security image is generated using design software which provides metadata that is indicative of whether an ON valued pixel is part of the first pattern (i.e. an "A" pixel) or the second pattern (i.e. a "B" pixel). This metadata, if provided, is utilized in conjunction with the digital security image in the printing operations 304, 308.

In another embodiment, such metadata is not provided. One scenario in which this situation can occur is when the digital security image is not generated by such design software, but rather is obtained by scanning a medium on which a security background that includes at least one security feature has been preprinted. The preprinted security background has typically been preprinted on the medium at a high resolution, such as by offset printing.

While one solution would be to print the desired foreground images on media stock which has been preprinted with the security background, this is often not possible or desirable. For example, the security background may be a single specimen for which stock is not available. Or, the security background may be unavailable in the size of the secure original document to be printed. It can therefore be advantageous to convert the preprinted security background to a digital security image that can then be printed along with the desired foreground image(s) on blank media stock. However, scanning, at a lower resolution, a security background that was printed at a higher resolution typically creates harmonic artifacts in the resulting digital security image that would be visible to the naked eye in a subsequently printed document that uses the security image. Furthermore, the information used to classify the pixels of the digital security image as belonging to one pattern and/or region is not provided by the scanning operation.

Figure 5A:
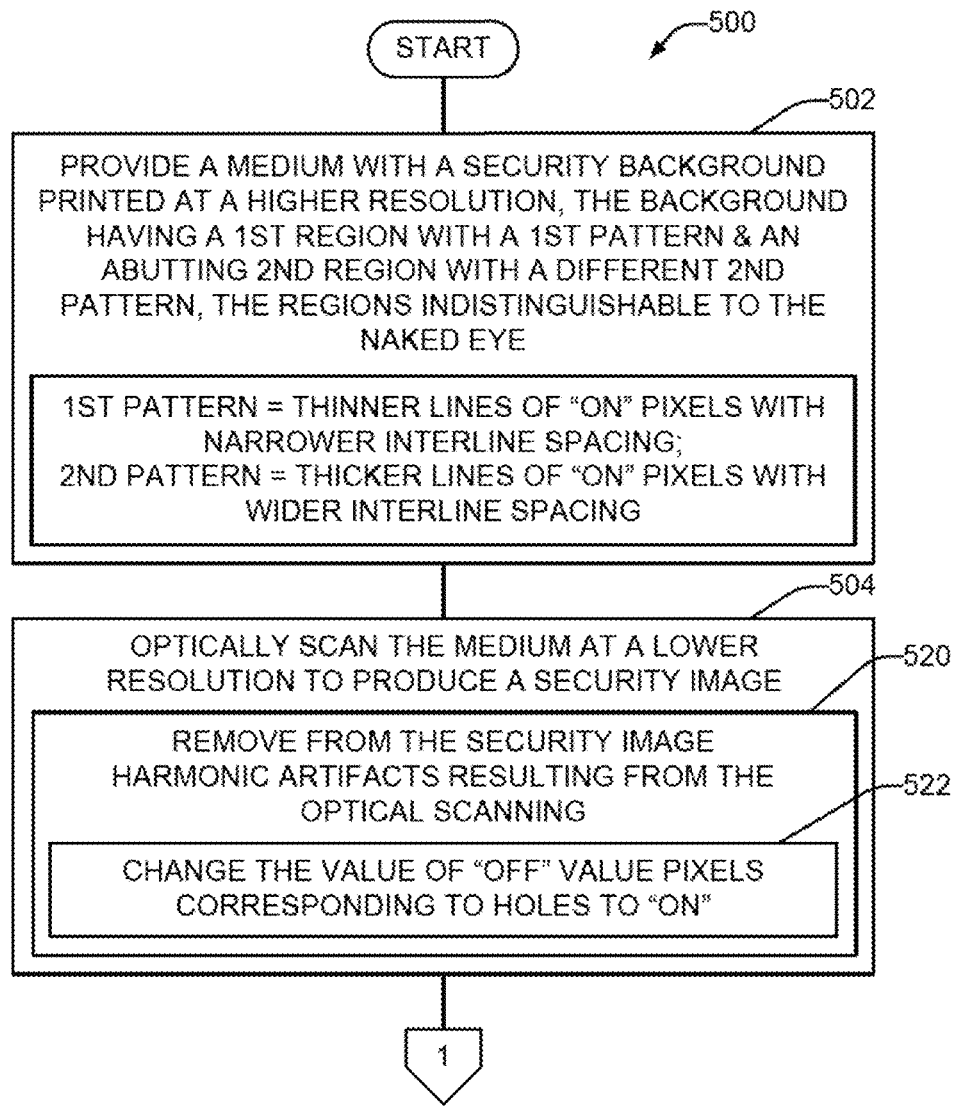
FIGS. 5A-C are flowcharts in accordance with an embodiment of the present disclosure of another method of digitally printing with a single colorant a security feature imperceptible to the naked eye.
Figure 5B:
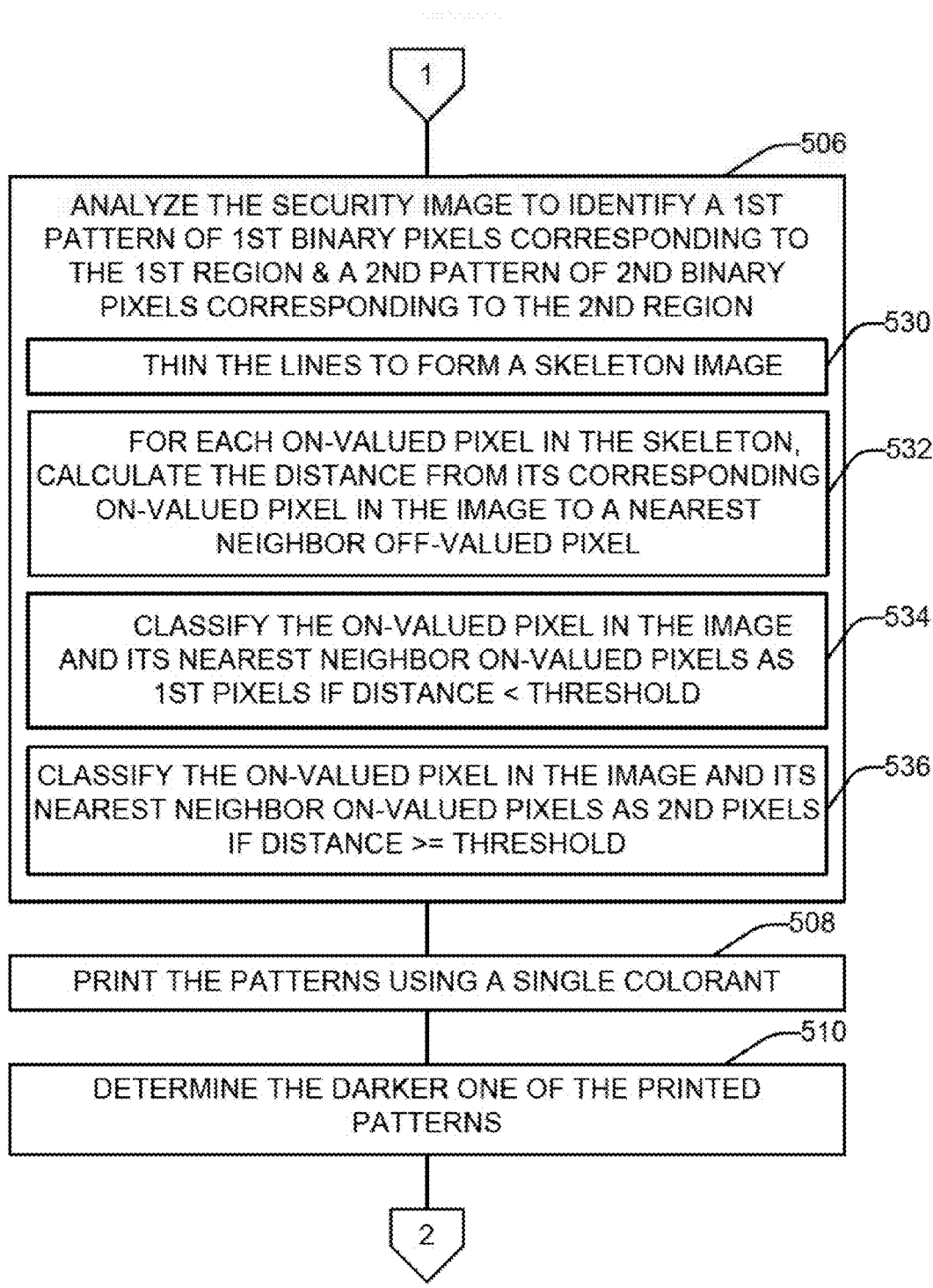
Figure 5C:
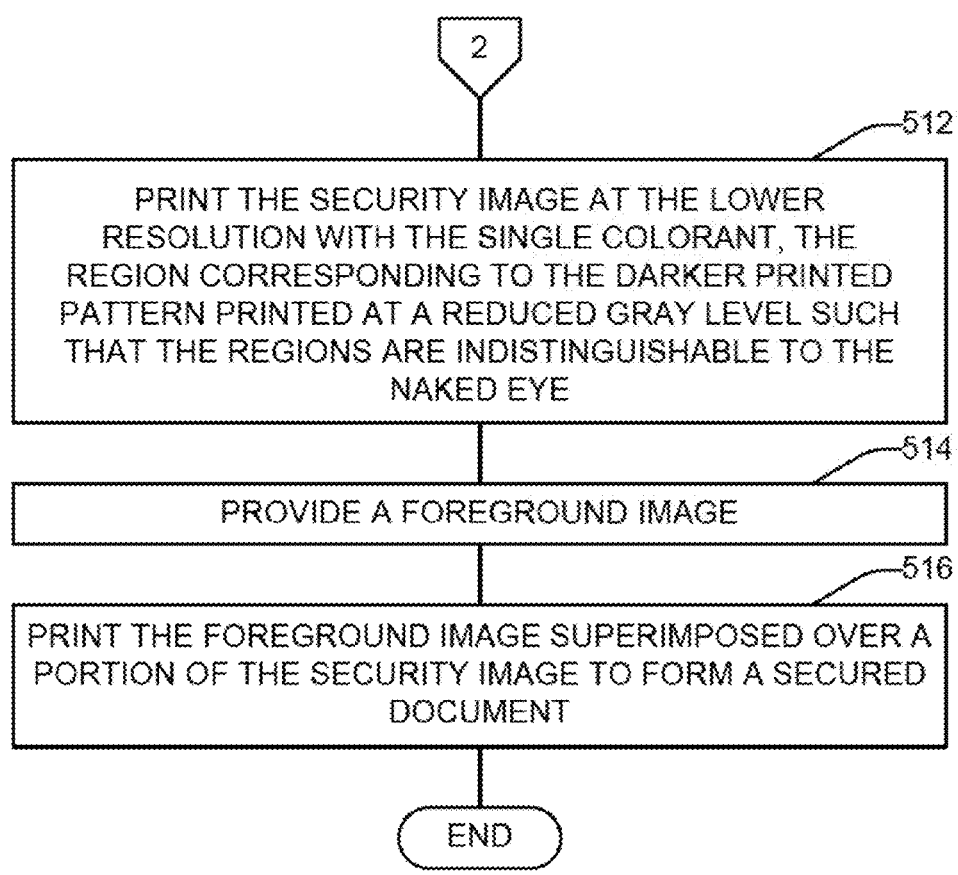

Considering now another method of digitally printing with a single colorant a security feature imperceptible to the naked eye, and with reference to FIGS. 5A-C, a method 500 begins at 502 by providing a medium having a security background preprinted thereon at a higher resolution. The background has a first region with a first preprinted pattern, and an abutting second region with a different second preprinted pattern. The first and the second region are substantially indistinguishable to the naked eye from a normal viewing distance. In some embodiments, the first preprinted pattern has thinner lines disposed at a narrower interline spacing, and the second preprinted pattern has thicker lines disposed at a wider interline spacing. At 504, the medium is optically scanned at a lower resolution to produce a security image. In some embodiments, the digital security image has a first pixel pattern of thinner lines of ON-valued binary pixels having a narrower interline spacing, and a second pixel pattern of thicker lines of ON-valued binary pixels having a wider interline spacing, corresponding to the thicker and thinner lines of the first and second preprinted patterns. At 506, the security image is analyzed to identify a first pixel pattern of first binary pixels that corresponds to the first region, and a second pixel pattern of second binary pixels that corresponds to the second region. At 508, the first and second pixel patterns are printed with the single colorant. In some embodiments, this may be performed in a similar manner as described previously with reference to step 304. At 510, a darker one of the first and second printed patterns is determined. In some embodiments, this may be performed in a similar manner as described previously with reference to step 306. At 512, the security image is printing at the lower resolution with the single colorant, with the region corresponding to the darker printed pattern printed at a reduced gray level such that the printed first and second regions on the printed security image are substantially indistinguishable to the naked eye. In some embodiments, this may be performed in a similar manner as described heretofore with reference to steps 308, 316, 318, and 320. At 514, a foreground image is provided, in some embodiments in a similar manner as described previously with reference to step 310. At 516, the foreground image is superimposed over a portion of the security image and then printed to form a secured original document that includes the security feature, in some embodiments in a similar manner as described previously with reference to step 312.

In some embodiments, steps 508 and 510 may be repeated, if desired, after applying a gray level reduction techniques to the printed patterns, in a similar manner as has been described heretofore with reference to steps 304 and 306 (FIG. 3).

Figure 6:
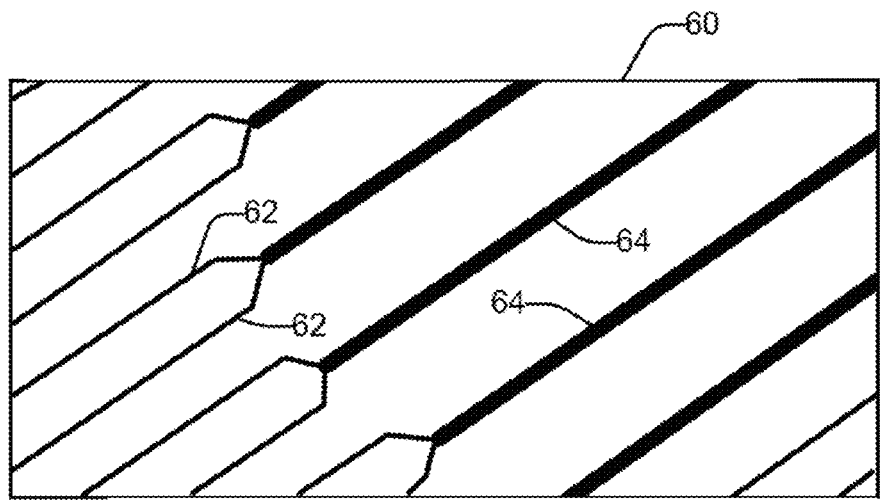
FIG. 6 is a schematic representation of an enlarged portion of a preprinted medium having a higher-resolution security background, in accordance with an embodiment of the present disclosure.
Figure 7:
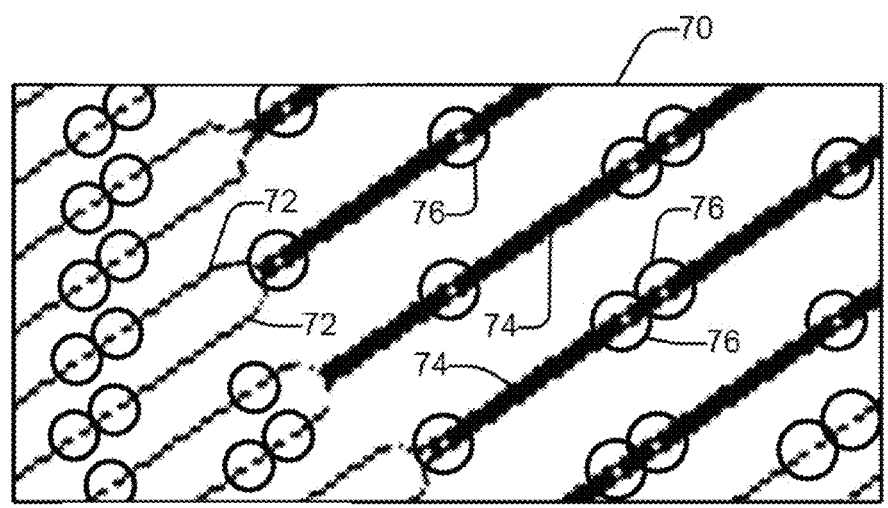
FIG. 7 is a schematic representation of an enlarged portion of a digital security image having scanning artifacts formed by optically scanning the medium of FIG. 6 at a lower resolution, in accordance with an embodiment of the present disclosure.

Considering now the effects of optically scanning a medium having higher-resolution preprinted security background with a lower-resolution optical scanning device, FIG. 6 illustrates an enlarged portion 60 of such a preprinted medium. A first printed pattern of thinner lines 62 is disposed at a narrower interline spacing, and a second printed pattern of thicker lines 64 is disposed at a wider interline spacing. FIG. 7 illustrates a corresponding portion 70 of a digital security image formed by optically scanning the medium at a lower resolution. Typically, the resolution at which the medium is scanned corresponds to the resolution of the printing system which will be used to print the digital security image and the corresponding original document. Due to the difference in resolution, characteristics of the optical scanner, and the like, the security image has harmonic and other artifacts that are not present in the security background. For example, the thinner lines 72 and thicker lines 74 typically have a jagged appearance. In addition, artifacts such as holes are apparent in the lines 72, 74 at the various positions indicated by circles 76. (It is to be understood that the circles 76 merely indicate the location of the holes, and that the circles 76 are not part of the digital security image). These holes often form a regular pattern, such as amoiré pattern, for example, which is readily visible to the naked eye when printed. As such, if the scanned security image is printed on an original document, these undesirable patterns will be visible to the naked eye, undesirably degrading the print quality of the document.

Figure 8:
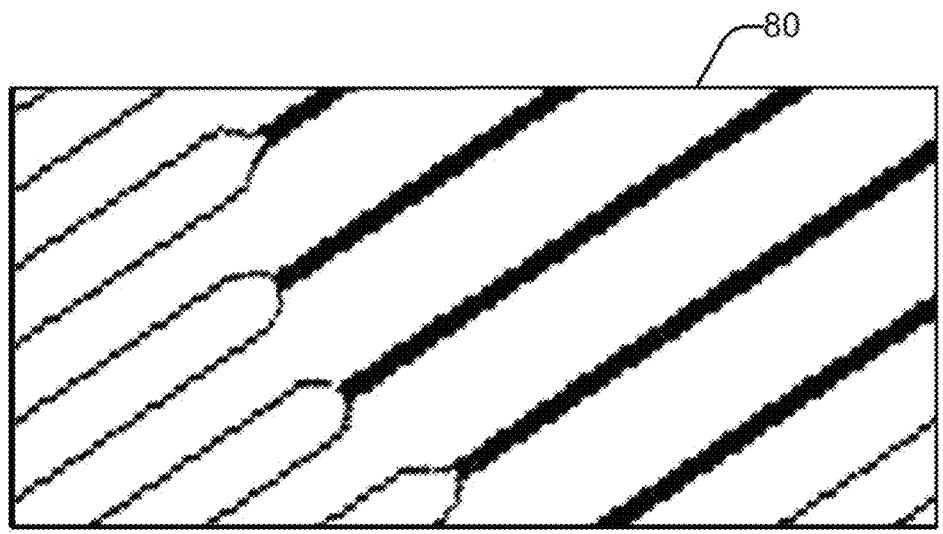
FIG. 8 is a schematic representation of the enlarged portion of the digital security image of FIG. 7 after the scanning artifacts have been repaired, in accordance with an embodiment of the present disclosure.

Therefore, in some embodiments, the method 500 removes from the security image, at 520, at least some of these artifacts. In some embodiments, the holes are digitally filled at 522. To fill the holes, the binary value of the pixels that correspond to at least some of the holes may be changed from an OFF value to an ON value. This can be accomplished using a template matching technique, or by other means. As an example, removing the artifacts in the portion 70 of the security image of FIG. 7 results in the portion 80 of the repaired security image of FIG. 8.

Analyzing 506 the security image to identify the first and second pixel patterns enables each of the ON-valued binary pixels to be classified as to which pixel pattern, and thus to which region of the security image, the pixel belongs. This outcome of this analysis reconstructs the missing pixel classification metadata for the security image, in situations where such metadata is not provided along with the security image. In addition to scenarios where a preprinted security background is scanned to form the security image, there may be other situations in which a digital security image is provided without any corresponding pixel classification data.

One analysis technique to classify the pixels begins, at 530, by thinning the thick and thin lines of the security image to form a skeleton of the lines. At 532, for each ON-valued pixel in the skeleton, the distance from its corresponding ON-valued pixel in the security image to a nearest neighbor OFF-valued pixel in the security image is calculated. At 534, the corresponding ON-valued pixel in the security image and its nearest neighbor ON-valued pixels are classified as first binary pixels if the distance is less than a threshold value. At 536, the corresponding ON-valued pixel in the security image and its nearest neighbor ON-valued pixels are classified as second binary pixels if the distance is at least the threshold value.

In some embodiments, as discussed heretofore, the regions of the security image are made indistinguishable to the naked eye by modifying the security image to reduce the number of binary pixels having an ON value in the region that corresponds to the darker printed pattern. The location of the ON-valued pixels that are set to an OFF value to implement the reduction may be selected in such a manner as to encode a message that is not apparent in the original document, but which would be detectable in a copy made by a copier or a scanner/printer. The portion 90 of the digital security image having an encoded message of FIG. 9 corresponds to the portion 80 of the digital security image of FIG. 8. With reference to FIG. 9, assume that the thicker lines correspond to the darker printed pattern. To reduce the gray level of that region, holes 92 may be inserted into some of the thicker lines. The location selected for the holes may result, in some embodiments, in a set of line segments, such as segments 94, that can encode a message in a manner similar to, for example, a bar code. More than one copy of the encoded message may be included in the security image. This technique can provide an additional layer of security for an original printed document. For example, the encoded message may identify the user who generated the original documents, and/or the printing system on which it was printed. This can allow copied documents to be traced back to the original document.

Figure 10:
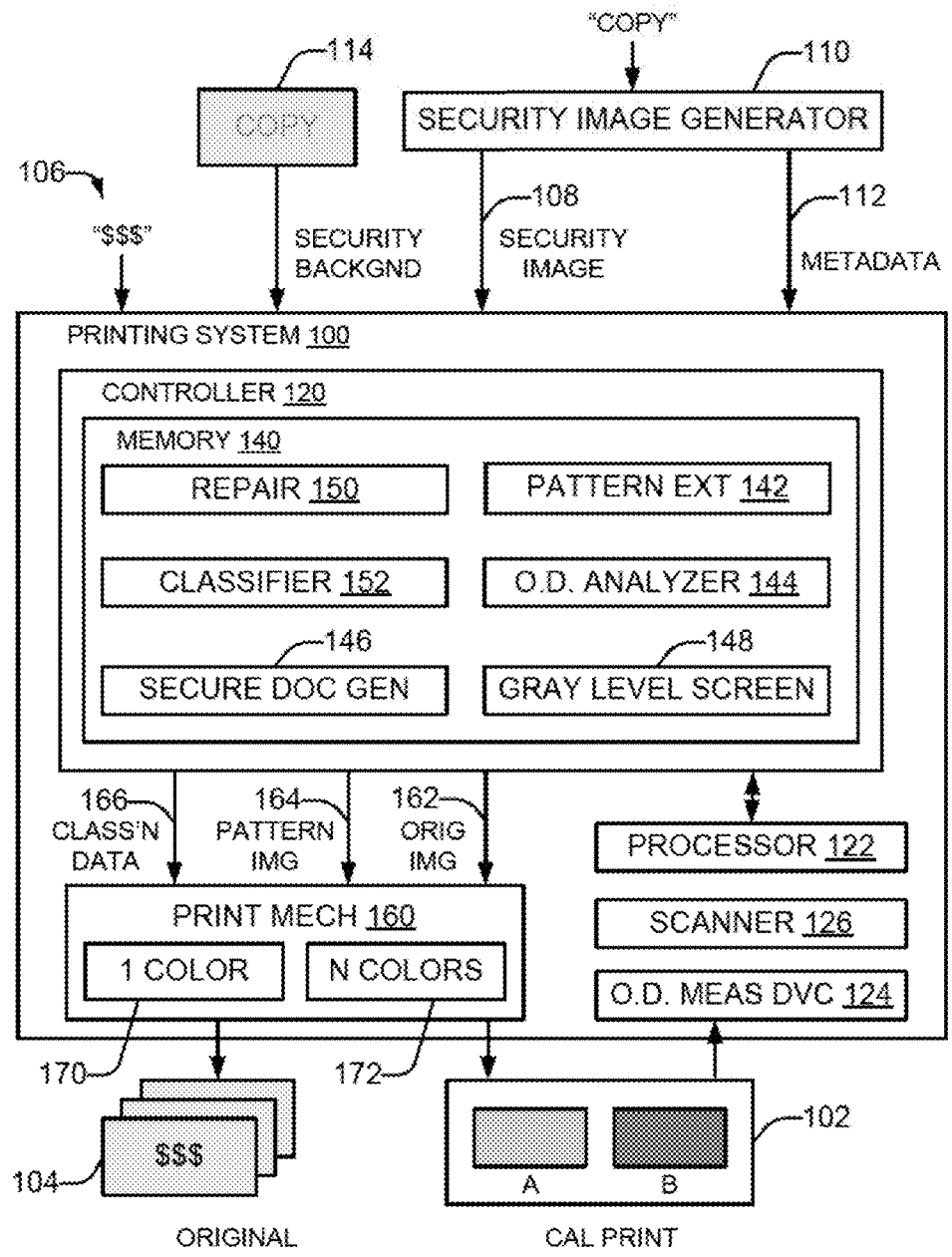
FIG. 10 is a block diagram of a printing system usable to implement the methods of the flowcharts of FIGS. 3A-B and 5A-C and to print a security image with a single colorant, in accordance with an embodiment of the present disclosure.

Considering now a printing system usable to digitally print with a single colorant a security feature imperceptible to the naked eye, and with reference to FIG. 10, a printing system 100 is configured to print a calibration print 102 and a secure original document 104. The secure original document 104 comprises a foreground image 106 (represented as the text "$$$") superimposed on a security image. The security image may be a security image 108 of binary pixels that is received by the printing system 100. In some embodiments, the security image 108 may be produced by a security image generator 110, such as a design software application running on a computer system. Metadata 112 indicative of which binary pixels of the security image correspond to a first pixel pattern, and which binary pixels correspond to a second pixel pattern, may also be provided to the printing system 100. For example, the image generator 110 may generate the metadata 112 along with the security image 108. In other embodiments, the security image may be generated from a security background 114, preprinted on a medium at a high resolution, which is provided to the printing system 100. In still other embodiments, the security image 108 may be provided to the printing system 100 in a different manner.

The printing system 100 includes a controller 120 and a print mechanism 160. The printing system 100 may be implemented using hardware, software, firmware, or a combination of these technologies. Subsystems, or portions of subsystems, of the printing system 100 can be implemented using dedicated mechanical and electrical hardware, or a combination of dedicated hardware along with a computer or microprocessor controlled by firmware or software. Dedicated electrical hardware may include discrete or integrated analog circuitry and digital circuitry such as programmable logic device and state machines. Firmware or software may define a sequence of logic operations and may be organized as modules, functions, or objects of a computer program.

In some embodiments, the controller 120 includes at least one processor 122 and at least one memory 140. A memory 140 is a computer-readable medium on which instructions executable by the processor 122 may be stored. A computer-readable medium can be any means that can store, communicate, propagate, or transport the program for use by or in connection with the printing system 100. The computer-readable medium can be, for example but not limited to, an electronic, magnetic, optical, electromagnetic, infrared, or semiconductor system, apparatus, device, or propagation medium. A non-exhaustive list of more specific examples of the computer-readable medium includes an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), an a portable compact disc read-only memory (CD-ROM) (optical).

The memory 140 includes firmware or software organized into various components which may be modules, functions, objects, or the like. The memory typically includes components such as an operating system, device drivers, communications or networking software, and the like. In some embodiments, components may implement methods performed by the printing system 100, such as, for example, method 300 (FIG. 3) and method 500 (FIG. 5). The various elements and/or steps of these methods may represent a section or portion of firmware or software code that performs the corresponding logical operations. Although the flowcharts of FIGS. 3-5 show a specific flow of execution, it is understood that the order of execution may differ from that which is depicted. For example, the order of execution of two or more blocks may be scrambled relative to the order shown. Also, two or more blocks shown in succession may be executed concurrently or with partial concurrence.

In embodiments where the printing system 100 receives a preprinted security background 114, the controller 120 is configured to optically scan the background 114 using a scanner 126 in or coupled to the printing system 100 to form the digital security image 108. Since the scanner 126 typically produces a security image 108 at a lower resolution than that of the preprinted security background 114, the controller 120 executes an artifact repair module 150 in the memory 140 to repair scanning artifacts in the security image 108 resulting from the downsampling. This repair operation may be performed in a similar manner as has been described heretofore with reference to steps 504, 520-522 of FIG. 5.

The controller 120 is also configured to print a calibration print 102 on a print medium, using a single colorant 170 of the print mechanism 160. The calibration print 102 has a first and a second pattern of binary pixels of a digital security image. The digital security image has a first region formed by the first pattern and an abutting second region formed by the second pattern, and the first and second regions each are intended to produce regions of the same or similar perceived gray level when printed. The patterns may be denoted "A" and "B" respectively. A pattern extractor 142 in memory 140 may extract the patterns from the security image and generate the pattern image data 164 for the calibration print 102. In identifying which pixels of the security image belong to pattern A and which to pattern B so as to print the proper patterns on the calibration print 102, the patter extractor 142 uses the provided metadata 112. If metadata 112 is not provided to the printing system 100, the controller 120 executes a pixel classifier 152 in the memory 140 that processes the security image 108 to classify each pixel as belonging to one of the two pixel patterns A and B in the image 108 prior to extracting the first and second patterns and printing the calibration print 102. This classification operation may be performed in a similar manner as has been described heretofore with reference to steps 506, 530-536 of FIG. 5. The controller 120 sends the pattern image data 164 for the calibration print 102 to the print mechanism 160 for printing the calibration print 102.

The controller 120 is further configured to determine a darker one of the first ("A") and second ("B") patterns as printed on the calibration print 102. An optical density analyzer 144 in memory 140 may perform, orchestrate, or participate in this operation. In some embodiments, an optical density measurement device 124 such as, for example, a densitometer may be disposed in, or coupled to, the printing system 100 for making the optical density measurement of the A and B patterns on the calibration print 102. The measurement typically is a relative measurement, and includes determining a percentage difference between the two patterns as printed. In other embodiments, the scanner 126 may be used in making the optical density measurement. In still other embodiments, the measurement is made external to the printing system, such as by an off-line optical density measurement device or by a visual comparison by an operator, and the results may subsequently be input to the printing system through, for example, a keyboard.

The controller 120 is additionally configured to print the digital security image using a single colorant 170 of the print mechanism 160, with the region corresponding to the darker printed pattern printed at a reduced gray level relative to the nominal gray level used to print the lighter printed pattern. As a result, the printed first and second regions appear substantially indistinguishable to the naked eye on the secure original document 104. These operations may be orchestrated by a secure document generator 146 in memory 140. The secure document generator 146 superimposes the foreground image 106 on the digital security image prior to generating the secure original document image data 162. While the security image is printed with the single colorant 170, the foreground image can be printed with multiple other colorants 172 instead of, or in addition to, the single colorant 170.

In some embodiments, a gray level screen 148 modifies the security image by applying a screen or halftone that reduces the number of binary pixels having an ON value in the region that corresponds to the darker printed pattern. The screening pattern is designed so as to prevent or minimize the perceptibility of scanning artifacts in the printed original document 104. The screening pattern may also be designed to encode a message in the security image, as has been described heretofore with reference to FIG. 9. The foreground image 106 is superimposed over the modified digital security image to form a secure original document image 162. The controller 120 sends the secure original document image 162 to the print mechanism 160 to print the secure original document 104. Use of the gray level screen 148 tends to fit well into existing printing workflows, since the reduction in gray level of the darker region is implemented within the data of the modified security image 108.

In other embodiments, the security image 108 is not modified to reduce the gray level of the darker region. As a result, in addition to the secure original document image 162, the controller 120 provides the print mechanism 160 with classification data 166 that indicates which ON-valued pixels in the document image 162 correspond to pattern A, and which correspond to pattern B. This technique provides optimal print quality, in that the reduction in gray level is achieved without modifying the security image 108.

The print mechanism 160 uses the classification data 166 to modulate the darkness level of the single colorant when printing pixels of the darker region of the security image. How darkness level modulation is accomplished depends on the printing technology used in the print mechanism 160. For example, for printing technologies such as liquid electrophotography or toner electrophotography, ON-valued pixels of the region corresponding to the darker printed pattern are printed using a lower laser power than a nominal laser power used for printing the ON-valued pixels of the lighter printed pattern. The laser power level may be directly proportional to the amount of liquid or toner printed, and thus to the darkness of the printed region. As another example, for liquid jetting technologies, ON-valued pixels of the region corresponding to the darker printed pattern are printed using a reduced amount of the single colorant than a nominal amount of the single colorant used for printing the ON-valued pixels of the lighter printed pattern. The reduced amount of the colorant may be achieved, for example, by printing a fewer drops of the colorant than printed for the nominal amount.

From the foregoing it will be appreciated that the printing system and methods provided by the present disclosure represent a significant advance in the art. Although several specific embodiments have been described and illustrated, the disclosure is not limited to the specific methods, forms, or arrangements of parts so described and illustrated. This description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of digitally printing a security feature with a single colorant, comprising:
   optically scanning, at a lower resolution, a medium having a security background preprinted thereon at a higher resolution, the background having a first region with a first preprinted pattern and an abutting second region with a different second preprinted pattern, the first and second regions substantially indistinguishable to the naked eye, the scanning producing a security image;
   analyzing the security image to identify a first pixel pattern of first binary pixels corresponding to the first region and a second pixel pattern of second binary pixels corresponding to the second region;
   printing the first and second pixel patterns with the single colorant;
   determining a darker one of the first and second printed patterns; and
   printing the security image at the lower resolution with the single colorant, the region corresponding to the darker printed pattern printed at a reduced gray level such that the printed first and second regions are substantially indistinguishable to the naked eye.

2. The method of claim 1, wherein the first pixel pattern comprises thinner lines of ON-valued pixels having a narrower interline spacing, and wherein the second pixel pattern comprises thicker lines of ON-valued pixels having a wider interline spacing.

3. The method of claim 2, wherein analyzing the security image comprises:
   thinning the thicker and thinner lines to form a skeleton of the lines;
   for each ON-valued pixel in the skeleton, calculating the distance from its corresponding ON-valued pixel in the security image to a nearest neighbor OFF-valued pixel in the security image;
   classifying the corresponding ON-valued pixel in the security image and its nearest neighbor ON-valued pixels as first binary pixels if the distance is less than a threshold value; and classifying the corresponding ON-valued pixel in the security image and its nearest neighbor ON-valued pixels as second binary pixels if the distance is at least the threshold value.

4. The method of claim 2, wherein the security image includes harmonic artifacts resulting from the optical scanning, the method further comprising:
removing at least some of the artifacts from the security image.

5. The method of claim 1, wherein the security image includes harmonic artifacts resulting from the optical scanning, the method further comprising:
removing at least some of the artifacts from the digital security image.

6. The method of claim 5, wherein the harmonic artifacts comprise holes of OFF-value pixels in at least some of the lines of ON-value pixels, comprising:
digitally filling the holes by changing the binary value of the corresponding pixels from OFF to ON.

7. A printing system, comprising:
a print mechanism; and
a controller configured to
optically scan, at a lower resolution, a medium having a security background preprinted thereon at a higher resolution, the background having a first region with a first preprinted pattern and an abutting second region with a different second preprinted pattern, the first and second regions substantially indistinguishable to the naked eye, the scanning producing a security image;
analyze the security image to identify a first pixel pattern of first binary pixels corresponding to the first region and a second pixel pattern of second binary pixels corresponding to the second region,
print the first and second pixel patterns with the single colorant;
determine a darker one of the first and second printed patterns; and
print the security image at the lower resolution with the single colorant, the region corresponding to the darker printed pattern printed at a reduced gray level such that the printed first and second regions are substantially indistinguishable to the naked eye.

8. The printing system of claim 7, wherein the controller is further configured to
receive the digital security image; and
receive metadata associated with the image that indicates which of the binary pixels of the image correspond to the first pattern and the second pattern.

9. The printing system of claim 8, wherein the print mechanism prints each ON-valued pixel of the region corresponding to the darker printed pattern using a lower laser power than a nominal laser power used for printing each other ON-valued pixel.

10. The printing system of claim 7, wherein the controller is further configured to
optically scan a preprinted security background to form the security image; and
analyze the security image to detect the first and second patterns and to identify which of the binary pixels of the image correspond to the first pattern and the second pattern.

11. The printing system of claim 10, wherein the controller is further configured to
apply a gray level screen to the security image to reduce the number of binary pixels having an ON value in the region corresponding to the darker printed pattern; and
print the modified security image with the single colorant.

12. The printing system of claim 7, wherein the print mechanism prints each ON-valued pixel of the region corresponding to the darker printed pattern using a lower laser power than a nominal laser power used for printing each other ON-valued pixel.

13. The printing system of claim 7, wherein the controller is further configured to
apply a gray level screen to the security image to reduce the number of binary pixels having an ON value in the region corresponding to the darker printed pattern; and
print the modified security image with the single colorant.

* * * * *